United States Patent [19]

Ovadia

[11] Patent Number: 5,334,402
[45] Date of Patent: Aug. 2, 1994

[54] HEAT PROCESSING OF A PRODUCT

[75] Inventor: David Ovadia, Manhattan, Kans.

[73] Assignee: Kansas State University Research Foundation, Manhattan, Kans.

[21] Appl. No.: 972,468

[22] PCT Filed: Aug. 1, 1991

[86] PCT No.: PCT/US91/05470
§ 371 Date: Feb. 22, 1993
§ 102(e) Date: Feb. 22, 1993

[87] PCT Pub. No.: WO92/02150
PCT Pub. Date: Feb. 20, 1992

[51] Int. Cl.[5] ............................ A23L 3/00; H05B 6/00
[52] U.S. Cl. .................................... 426/241; 99/470; 99/472; 99/483; 219/686; 219/771; 426/243; 426/244; 426/521
[58] Field of Search ............... 426/241, 242, 243, 244, 426/521, 523; 219/10.55 R, 10.55 M; 99/470, 472, 474, 483

[56] References Cited

U.S. PATENT DOCUMENTS

| | | | |
|---|---|---|---|
| 3,437,495 | 4/1969 | Jeppson | 426/241 |
| 3,889,009 | 7/1975 | Lipoma | 426/243 |
| 4,318,931 | 3/1982 | Schiffmann et al. | 426/243 |
| 4,640,020 | 2/1987 | Wear et al. | 219/10.55 M |
| 4,809,596 | 3/1989 | Akutsu et al. | 99/483 |
| 4,812,606 | 3/1989 | Eke | 426/243 |
| 5,019,412 | 5/1991 | Hattori | 219/10.55 M |
| 5,066,503 | 11/1991 | Ruozi | 426/241 |

FOREIGN PATENT DOCUMENTS

| | | | |
|---|---|---|---|
| 60-126039 | 7/1985 | Japan | 426/241 |
| 855558 | 12/1960 | United Kingdom | 426/237 |

Primary Examiner—George Yeung
Attorney, Agent, or Firm—Hovey, Williams, Timmons & Collins

[57] ABSTRACT

A method and apparatus are provided for the rapid heat treatment of products, and especially gas-permeable, water-containing products such as bread dough. Baking of dough involves placing the dough within an enclosed oven or zone (1) and subjecting the dough to dielectric (e.g. radio-frequency or microwave) heating using appropriate generators (6, 7, 7a, 8a). Radiant heat from an appropriate source (9) and hot oven gases are simultaneously applied for crust formation. During at least a portion of the baking cycle, the gas pressure within the zone (1) is selectively elevated by steam addition (10) in response to the rise in gas pressure within the dough resulting from vaporization of water therein. In this way, the pressure differential between the dough interior and the ambient environment is minimized, and the dough may be rapidly baked without fear of significant dough disruption. Cooling is effected by gradually reducing the zone pressure, through use of a vacuum pump (12). If desired, vacuum cooling can occur simultaneously with continued radiant heating crust formation. The process of the invention gives completely baked and cooled bread in a matter of minutes.

20 Claims, 2 Drawing Sheets

HEAT PROCESSING OF A PRODUCT

BACKGROUND OF THE INVENTION

1. Field of the Invention

The present invention relates to a method of heat processing a product, especially but not exclusively foodstuff, and relates particularly but not exclusively to the baking of bread.

The term "heat processing" is intended to cover, inter alia, the cooking of foodstuffs, including for example, the delicate vacuum cooking of meat, fish, vegetables or fruits, the pressure cooking of foodstuffs, and baking of farinaceous products such as bread.

With regard to bread, the time required to bake a loaf can be considerably shortened by baking a loaf's interior by microwaves and rapidly browning the exterior with conventional thermal heating, at temperatures higher than those usual for baking.

2. Discussion of the Prior Art

In industrialized countries it is common to cool bread to 21° C. in order to slice it. Conventional cooling, achieved by conduction of heat from the interior of the loaf to its surface, demands a long period of time. From there heat is conducted to the surrounding air, which heats and leaves the loaf surface by convection currents. Forced air convection is frequently used to accelerate heat removal. The heat transfer is an unsteady state process, one major problem being the low heat conductivity of bread. Increasing the velocity of the surrounding cooling air does not significantly increase the cooling rate of the bread. Using such method a standard 800 gram loaf of white bread generally requires two and a half hours to cool.

Vacuum cooling is a technique which has been used for some years and can be used to cool standard loaves of bread in around three and a half minutes. Both microwave heating and vacuum cooling dehydrate the product to a greater degree than using the normal techniques of conventional thermal heating and cooling thereby increasing the weight loss normally resulting from these normal techniques. This creates an economic disadvantage for low profit margin product sold by weight such, for example, as bread. The advantages of microwave-assisted baking followed by vacuum cooling of bread are extremely high speed, the option of using soft wheat flour only (that cannot usually be used alone to bake bread) and a product with a very greatly reduced microbial contamination free of secondary contamination from cooling air, due to the airless vacuum cooling.

OBJECTS AND SUMMARY OF THE INVENTION

An alternative heat energy source which can be used for baking is radio-frequency heat which, like microwave heating, permits acceleration of the baking process compared with conventional electrical resistance heating.

For convenience the term "dielectric heating" is used herein, where applicable, to include both microwave heating and radio-frequency heating.

The speed of baking by dielectric heating is still limited by the danger of product explosion caused by the rapid creation of internal steam pressure within the product, and it is an object of the present invention to obviate or mitigate this danger.

According to the broadest aspect of the present invention there is provided a method of heat processing a product, comprising the steps of:

placing said product in an enclosed zone; and subjecting said product while in said zone to dielectric heating; and during at least a portion of said heating processing within said enclosed zone by adding gas and/or subtracting gas from the enclosed zone.

Preferably the product is subjected to microwave heating.

Alternatively the product is subjected to radio frequency heating.

In the cases of roasting meat, coffee, cocoa or the baking of farinaceous products, if there is only steam and no oxygen and/or other gases present in the oven, some of the customary dehydration characteristics and/or thermal disintegration and oxidation reactions will not take place. These reactions can be desirable and essential for the marketability of certain food products, such as the brown crust and the fresh baked aroma of bread. In addition, if a food product is heat treated without oxygen and cooled, consequent oxidation may create undesirable flavors.

The selection of the constitution of supra-atmospheric pressure environment within the oven can determine such organoleptic characteristics of the food product.

The dielectric heating hereinbefore referred to in the various aspects of the present invention may be supplemented by conventional thermal heating which may be used simultaneously with or separately of the dielectric heating depending upon heat processing circumstances or requirements.

In the heat treatment of other products, particularly non-food, it may be necessary to prevent oxidation, in this case the oven-contained environment may be steam and/or nitrogen, and/or other nonoxidating gases or mixtures of gases.

According to another aspect of the present invention there is provided apparatus for heat processing of products, comprising: structure defining an enclosed chamber having selectively openable door means permitting placement of a product to be heat processed therein; means associated with said chamber-defining structure for dielectric heating of products placed therein; and pressure-altering means operatively coupled with said chamber-defining structure for selective addition or subtraction of gas from the chamber in order to selectively increase or decrease pressure conditions therein.

Preferably, the apparatus includes means within said chamber for generating radiant heat.

Preferably the dielectric heating means comprises means for generating microwaves.

Preferably the pressure altering means comprises a supply of gas and conduit means operatively connecting said supply and said chamber.

Preferably pressure altering means comprising a vacuum pump operatively coupled with said chamber.

According to a further aspect of the present invention there is provided a method of heat processing a gas-permeable product containing vaporizable water, said method comprising the step of: placing said product within an enclosed pressurizable zone; subjecting said product while in said zone to dielectric heating sufficient to cause vaporization of some of said water therein; and during at least a portion of said heat processing, increasing the pressure within the enclosure sufficiently to prevent significant disruption of the product by virtue of rapid migration of vaporized water therefrom.

According to yet another aspect of the present invention, therefore, there is provided a method of vacuum cooling a partially or completely baked dough-based product within a gaseous atmosphere comprising the steps of simultaneously subjecting the product to radiant heating sufficient to develop the crust of said product while reducing the pressure of the gaseous atmosphere around the product for rapid cooling thereof.

BRIEF DESCRIPTION OF THE DRAWING FIGURES

An embodiment of the present invention will now be described, by way of example, with reference to the accompanying drawings in which.

DETAILED DESCRIPTION OF THE PREFERRED EMBODIMENT

Figure 1:
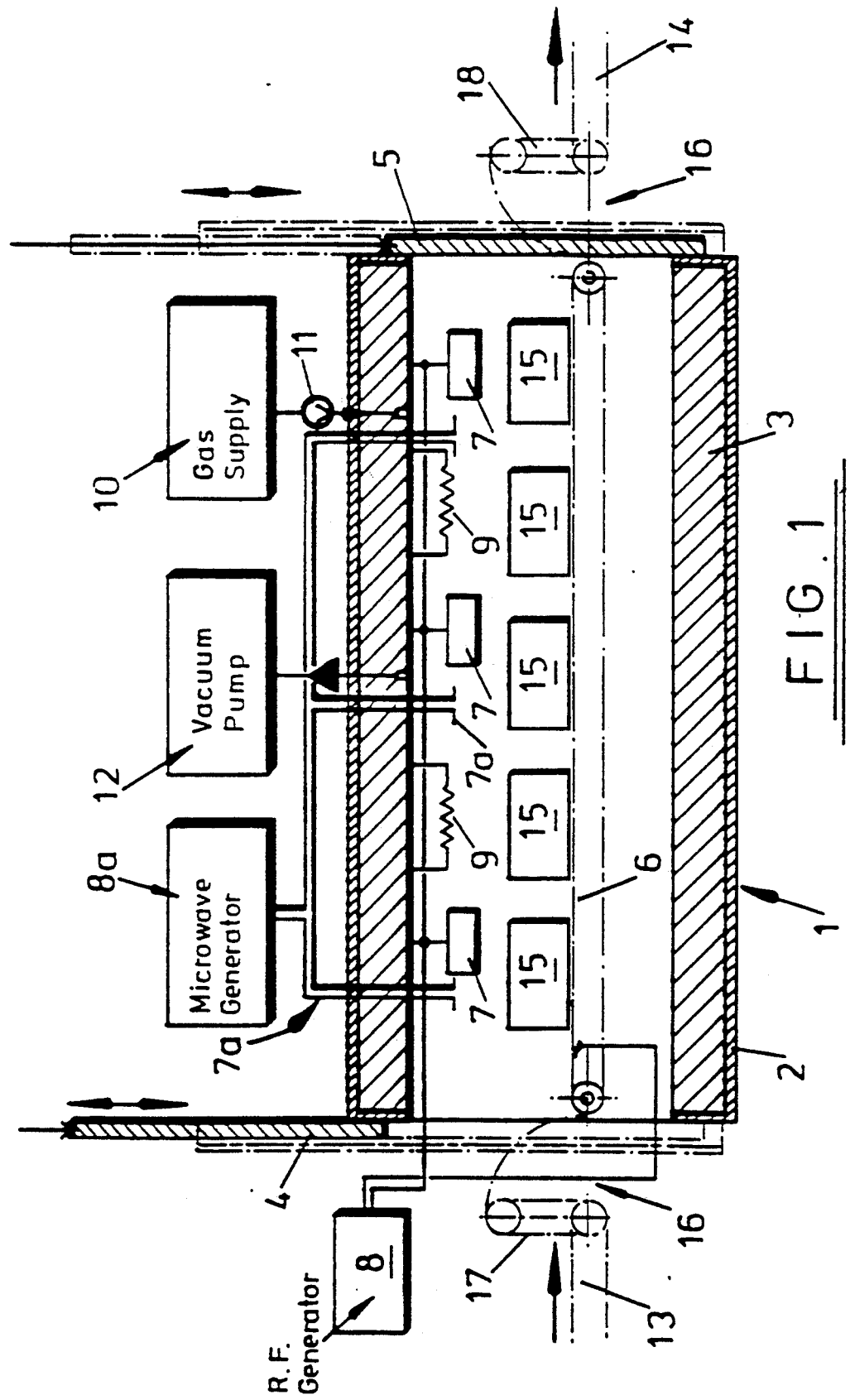
FIG. 1 is a schematic diagram of baking apparatus.

Referring to FIG. 1, there is shown an oven 1 cylindrical in cross-section for example and provided with a steel pressure housing or casing 2 capable of withstanding pressures up to 5 atmospheres for example and lined with ceramic 3 for electrical insulation and heat resistance purposes.

The oven 1 is provided with, at its respective ends, a sealable inlet door arrangement 4 and a sealable outlet door arrangement 5.

The oven 1 houses a product metal conveyor 6, or a non-metal conveyor supported and movable across a metal platform or table.

The metal conveyor 6 (or metal supporting platform or table) forms one electrode of a radio-frequency heating system which also includes the discrete electrodes 7 (although these may be replaced by a plate electrode extending the length of the oven 1) above the metal conveyor 6. The electrodes 6 and 7 are connected to a radio-frequency generator 8.

In lieu of (or in addition to) the RF heating structure, a schematically illustrated microwave generator may be used, transferring microwaves via wave guide outlets 7a, which evenly distribute the microwave field strengths throughout the chamber. The microwave generator may be, for example, a cavity magnetron, a plurality of magnetrons or a reflux klystron.

A preferred alternative to ceramic lining is to provide adequate air space (clearance) between the discrete electrodes 7 and the steel pressure casing 2 by appropriately dimensioning the diameter of the latter. This will achieve the same desired result as ceramic lining.

Conventional electrical resistance heaters 9 connected to main supply for example are also provided within the oven 1.

In accordance with this invention, the volumetric interior of the oven 1 is connected to a gas supply 10 by a pump 11 whereby said volumetric interior can be placed under supra-atmospheric pressure during the baking process.

The gas supplied may be stream, air (oxygen), nitrogen or any other gas required during the particular baking process being carried out within the oven 1.

Also in accordance with the present invention, the volumetric interior of the oven 1 is connected to a vacuum pump 12 whereby airless vacuum cooling of the baked product can be effected within the oven 1 without the need to transfer same to a separate cooling chamber.

External to the oven 1 there are two separate conveyors 13, 14. An inlet conveyor 13 is at the entrance and an outlet conveyor 14 at the exit of the oven 1. Inlet conveyor 13 supplies a product 15 to the oven and outlet conveyor 14 carries the baked product 15 away from the oven 1. Between the internal conveyor 6 and the inlet and outlet conveyors 13, 14 there is a gap 16. Drawbridge conveyors 17, 18 are employed to bridge the gap 16, one at either end of the oven 1, hen it is being loaded or unloaded. The drawbridge conveyor 17, 18, are rotatable about the inlet and outlet conveyors 13, 14 between a horizontal position aligned with the external 13, 14 and internal conveyor 6 and a position substantially vertical to the line of conveyors 6, 13, 14.

With the inlet door arrangement 4 open, outlet door arrangement 5 shut and the drawbridge conveyor 17 in its horizontal position a batch of products 15 to be heat processed are loaded into the oven 1 from the inlet conveyor 13 through inlet onto internal conveyor 6. The inlet door arrangement 4, is then shut and sealed and heat processing can commence. The door arrangements 4, 5 are described in more detail below.

Product 15 is heated by the dielectric 7 and electrical resistance heaters 9. The microwave or radio-frequency waves cause molecules of the product to vibrate and heat is generated by the friction between them, as is well known. The waves penetrate deeply into the product so that heat is generated throughout its bulk. If the product is a food product then, during heat processing, the pressure builds up within the food product due to rapid creation of heat and therefore steam. This allows for an external steam to be created that will not only counter balance the internal steam pressure within the product, but can furthermore, prevent a product from exploding. With this external steam counter pressure the heat processing speed can be greatly increased, no longer being limited due to the danger of product explosion. While the external pressure creation must primarily utilize steam, there is also a built in option for filling the pressure oven 1 with a controlled percentage of additional steam, pressurized air or oxygen via pump 11. Treating the product 15 with oxygen allows oxidation under pressure to take place. This can be desirable and essential for saleability of certain products, such as the brown crust and the fresh baked aroma of bread.

The heat treatment is followed by vacuum cooling of the product 15 in which the oven 1 is evacuated by a vacuum pump 12. Both dielectric heating and vacuum cooling dehydrate the product, but if baked in saturated pressurized steam there is no water vapor pressure gradient present to allow the moisture to escape. The product stays more moist than it usually would. The oven 1 is enclosed in the steel casing 2 which can withstand the pressure gradients relative to the surroundings during cooling. The dielectric 7 and/or 7a and electrical resistance heaters 9 are switched off and the pressure released prior to commencement of cooling.

At the end of the heat processing and cooling, the outlet door arrangement 5 is opened and the heat processed product 15 can exit through the outlet onto drawbridge conveyor 18 in its horizontal position to outlet conveyor 14.

In the case of certain products, particularly non-food, it may be necessary to prevent oxidation and therefore a gas such as nitrogen is pumped into the oven 1 during baking by the gas pump 11.

It is to be appreciated that the vacuum cooling could take place in a separate chamber with a conveyor system running between the oven 1 and the vacuum chamber.

The oven 1 and the separate vacuum cooler (if such) are both equipped with the capacity to monitor and record parameters such as temperature, pressure, percentage oxygen in the gases, heating medium and the percentage of other gases in the heating medium.

Figure 2:
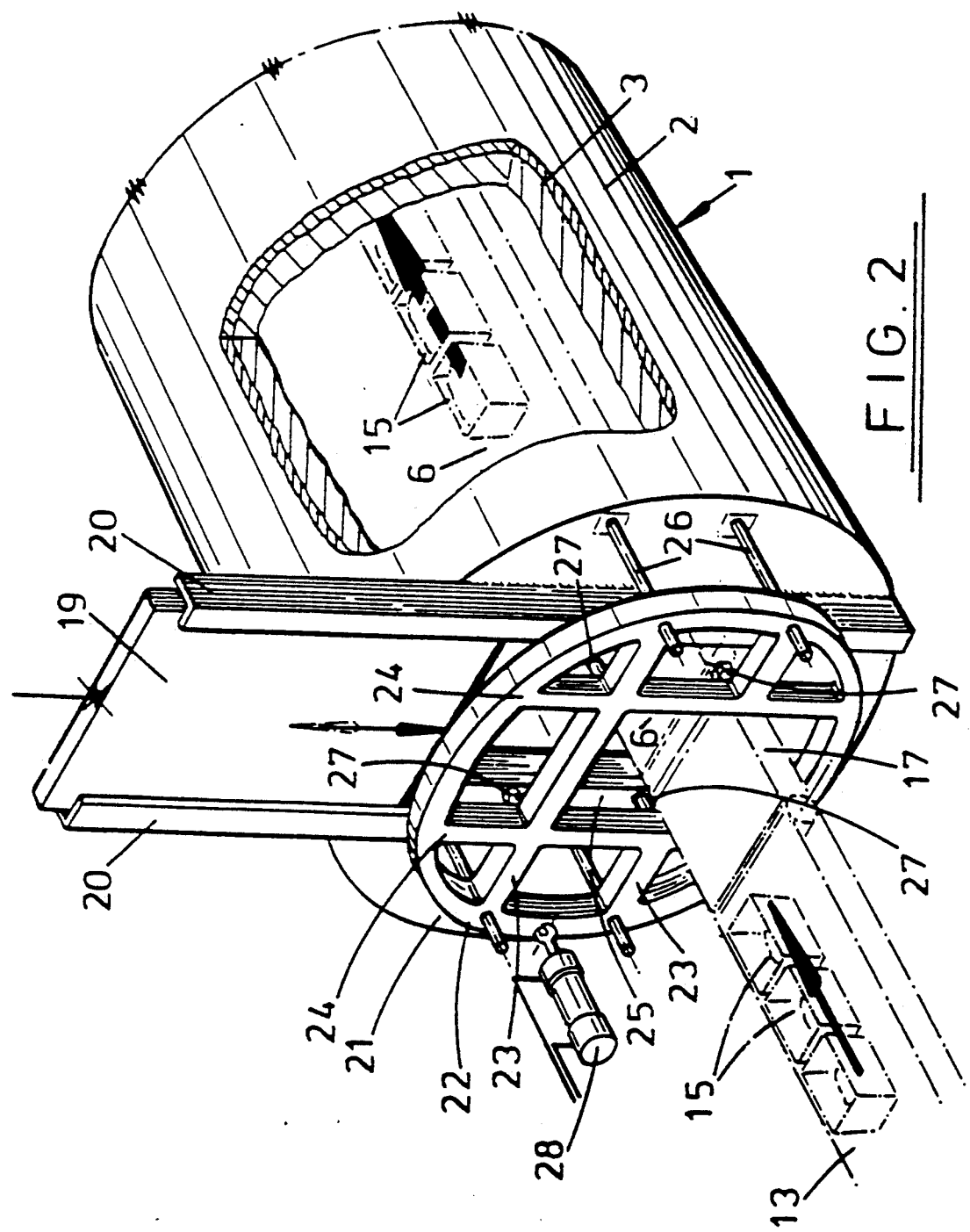
FIG. 2 is a perspective view of an oven including a door arrangement.

FIG. 2 shows in detail the door arrangements 4, 5 mentioned above. The arrangement 4, 5 is the same at the oven inlet and outlet and will be described only once.

The inlet to oven 1 is closable by sliding door 19, slidable in a vertical direction between two parallel guide brackets 20, fitted to either side of the oven 1 inlet. The sliding door 19 is a substantially square plate. In the lower position it fully closes the oven inlet, when raised it provides for access to the inlet. Each bracket 20 is L-shaped in cross section.

A clamping door 21 is used to clamp the sliding door 19 when in the closed position. It comprises a frame work of an outer circle 22, two horizontal straight frames 23 (one broken midway) and two vertical straight frames 24 disposed inside the outer circle 22 and such that they provide for a central window 25 aligned with the oven inlet. The clamping door 21 is slidable horizontally on horizontal rods 26 (four shown) positioned around the periphery of the inlet and fixed thereto such that their axes are parallel with that of the oven 1. The rods 26 are received in holes in the outer frame 22. On the side facing the oven the clamping door 21 has a rectangular guide framework incorporating four protruding legs 27 positioned at the four points where the horizontal frames 23 and vertical frames 24 intersect. The guide legs 27 protrude at right angles to the rest of the frame.

To load the oven 1 the clamping door 21 is slid away from the oven 1 on the horizontal rods 26 and the sliding door 19 is raised vertically to open the oven inlet. The inlet drawbridge conveyor 17 is then lowered to communicate with the internal conveyor 6 and loading can commence. Note that the window 25 in the frame is designed to allow the drawbridge conveyor 17 to be correctly positioned. When the product 15 batch has been loaded the drawbridge conveyor 17 is raised, the sliding door 19 is lowered to close the inlet and the clamping door 21 is slid towards the oven 1 such that the legs 27 about the sliding door 19 and hold it tightly in position. A seal (not shown) such as silver seal used in firearms or some other heat-resistant sealing element, that can stand up to 350° C. without deteriorating, is provided between the oven 1 and the sliding door 19 such that when clamped the arrangement can withstand an internal vacuum or an internal pressure in excess of the surroundings, of about 5 atmospheres maximum. The clamping door 21 is locked in position by means of a hydraulic or pneumatic actuator 28 (as shown in FIG. 2) or alternatively by virtue of a screw type device used to move the door 21 along the rods 26 (not shown), for example.

Unloading is achieved at the exit end 11 (see FIG. 4) by releasing the clamp door 21 opening the sliding door 20 and lowering the drawbridge conveyor 18.

It is possible to produce sterile food with the oven according to this invention due to the supra-atmospheric pressure as a result of which the temperature inside the food, for example a loaf of bread, can reach, say, 121° C. (the boiling point of water at about 2 atmospheres of pressure), which sterilizes food. At this temperature the heat resistant bacterial spores are also killed. Also, since the heat processing and vacuum cooling are done in the same vessel there is no air contamination when the product passes from the oven to separate cooler.

The significance of sterile products are that they have considerably increased shelf-life and usually superior quality before the given shelf-life expires. Prevented spillage is twofold:

a. Apparent spoilage in which the food can look and/or taste bad, but is not necessarily toxic.

b. Toxic spoilage in which the spoilage is not necessarily apparent, and can therefore be highly dangerous.

Bread is usually not sterile. Microbial deterioration of bread is usually the growth of mold or going sticky on the inside due to mucus producing bacteria ("ropy bread"). These are prevented in practice by adding about 0.2%–0.3% of a salt of propionic acid-sodium or calcium propionate usually. A baking process as defined herein that produces sterile bread, and obviates the use of chemical preservatives, would be highly advantageous.

In addition to food any other implements or substances could also be sterilized using the oven according to this invention. Examples are cotton wool for use in surgery or microbiology laboratories, bandages, substrates for microorganisms, pipettes, bottles of sterile water of infusions, surgical instruments, etc. By using radio waves the sterilization is accelerated, in certain cases, and, in some instances, vacuum cooling could simultaneously cool and dry unwanted, residual moisture.

The equipment, as described could be used in vacuum cook a product. Foods requiring delicate cooking could be cooked by applying a partial vacuum to the oven 1 via vacuum pump 12 in combination with the dielectric heating process. This allows cooling to be carried out at lower temperatures (for example boiling of water at 70° instead of 100° C.) and thus desirable flavor compounds and other organoleptic qualities, destroyed at the higher temperature and not at the lower, would be preserved. The dielectric heat rays are able to travel in a vacuum or partial vacuum and they can bake the outer crust of, for example, a loaf of bread while the center of the loaf is cooled by the escape of water vapor. The escaping water vapor collects heat while traveling to the surface and thus removes the heat on escape thereby cooling the surface of the loaf also.

The above-described oven with vacuum environment facility can be used to ensure very rapid drying with additional advantage that water will boil away at temperatures lower than the usual 100° C. of atmospheric pressure drying thereby creating less damage to the product being dried.

The oven with vacuum environment facility consequently is suitable, inter alia, for rapid drying of fruit and vegetables.

I claim:

1. A method of heat processing a product, comprising the steps of: placing said product in an enclosed zone; subjecting said product while in said zone to dielectric heating; and during at least a portion of said heat processing within said zone, first adding gas to said zone to increase the pressure therein to level above atmospheric, and thereafter gradually reducing the pressure within said zone by subtracting gas therefrom until the pressure conditions within said zone are below atmospheric.

2. A method as set forth in claim 1, wherein the dielectric heating includes microwave heating.

3. A method as set forth in claim 1, wherein the dielectric heating includes radio frequency heating.

4. A method as set forth in claim 1, said product being selected from the group consisting of foodstuffs, and medical and scientific articles.

5. A method as set forth in claim 4, said product being a foodstuff selected from the group consisting of farinaceous products, meat, fish, vegetables and fruit.

6. A method as set forth in claim 5, said product being bread dough.

7. A method as set forth in claim 1, said gas being saturated steam.

8. A method as set forth in claim 1, including the step of subjecting said product to radiant heating while gas is subtracted from said zone for simultaneous cooling of the product while it is being subjected to said radiant heat.

9. A method of heat processing a gas-permeable product containing vaporizable water, said method comprising the steps of:
    placing said product within an enclosed zone;
    subjecting said product while in said zone to dielectric heating sufficient to cause vaporization of some of said water therein; and
    during at least a portion of said heat processing, first adding gas to said zone, and thereafter gradually reducing the pressure within said zone by subtracting gas therefrom until the pressure conditions within said zone are below atmospheric.

10. A method as set forth in claim 9, including the step of subjecting said product to radiant heating while gas is subtracted from said zone for simultaneous cooling of the product while it is being subjected to said radiant heat.

11. A method as set forth in claim 9, wherein the dielectric heating includes microwave heating.

12. A method as set forth in claim 9, wherein the dielectric heating includes radio frequency heating.

13. A method as set forth in claim 9, said product being selected from the group consisting of foodstuffs and medical and scientific articles.

14. A method as set forth in claim 13, said product being a foodstuff selected from the group consisting of farinaceous products, meat, fish, vegetables and fruit.

15. A method as set forth in claim 14, said product being bread dough.

16. A method as set forth in claim 9, said gas being saturated steam.

17. A method of heating processing a gas-permeable product containing vaporizable water, said method comprising the steps of:
    placing said product within an enclosed zone;
    subjecting said product while in said zone to dielectric heating sufficient to cause vaporization of some of said water therein;
    during at least a portion of said heat processing, increasing the pressure within the enclosure sufficiently to prevent significant disruption of the product by virtue of rapid migration of vaporized water therefrom; and
    monitoring the build-up of pressure within said product by virtue of vaporization of water therein, and correspondingly adjusting the pressure conditions within said zone.

18. A method of vacuum cooling a partially or completely baked dough-based product comprising the steps of simultaneously subjecting the product to radiant heating sufficient to develop the crust of said product while applying a vacuum to reduce the gas pressure around the product for rapid cooling thereof.

19. A method of bread production comprising the steps of:
    placing a bread dough within an closed pressurizable zone;
    subjecting the dough while in said zone to dielectric heating sufficient to initiate baking of the dough and vaporization of internal water within the dough;
    subjecting the dough while in said zone to radiant heating for creating a crust thereon;
    adding steam to the zone in order to increase the gas pressure therein to level sufficient to prevent rapid migration of vaporized water therefrom to thereby prevent significant disruption of the dough;
    terminating the application of dielectric heating of the dough when the latter has been baked to a desired degree; and
    gradually reducing the pressure within said zone without casing significant disruption of the baked dough to a level below atmospheric pressure in order to rapidly cool the baked dough.

20. A method as set forth in claim 19, wherein the dielectric heating includes microwave heating.

* * * * *